(12) United States Patent
Trollope et al.

(10) Patent No.: US 8,949,981 B1
(45) Date of Patent: Feb. 3, 2015

(54) TECHNIQUES FOR PROVIDING PROTECTION AGAINST UNSAFE LINKS ON A SOCIAL NETWORKING WEBSITE

(75) Inventors: Rowan Trollope, London (GB); Chandrasekhar Cidambi, Fremont, CA (US); Lipphei Adam, Austin, TX (US); Caskey L. Dickson, La Crescenta, CA (US)

(73) Assignee: Symantec Corporation, Mountain View, CA (US)

( * ) Notice: Subject to any disclaimer, the term of this patent is extended or adjusted under 35 U.S.C. 154(b) by 546 days.

(21) Appl. No.: 13/036,439

(22) Filed: Feb. 28, 2011

(51) Int. Cl.
  *G06F 21/50* (2013.01)
(52) U.S. Cl.
  USPC ............ 726/22; 726/23; 726/24; 726/25; 709/224
(58) Field of Classification Search
  USPC .......... 726/8, 22–25; 709/224; 705/30, 38–41
  See application file for complete search history.

(56) References Cited

U.S. PATENT DOCUMENTS

| 6,163,778 | A  | * | 12/2000 | Fogg et al. ........................ 1/1 |
| 8,150,779 | B1 | * | 4/2012 | Gauvin ........................ 705/319 |
| 8,448,241 | B1 | * | 5/2013 | Kadakia ........................ 726/22 |
| 2005/0086307 | A1 | * | 4/2005 | Kelley et al. ........................ 709/206 |
| 2010/0049565 | A1 | * | 2/2010 | Aebig et al. ........................ 705/7 |
| 2011/0225142 | A1 | * | 9/2011 | McDonald ........................ 707/710 |
| 2011/0296003 | A1 | * | 12/2011 | McCann et al. ........................ 709/224 |
| 2012/0017281 | A1 | * | 1/2012 | Banerjee et al. ........................ 726/25 |
| 2012/0173690 | A1 | * | 7/2012 | Cherkauer ........................ 709/223 |

OTHER PUBLICATIONS

Web Page for Websense Defensio: Websense Defensio 2.0, The Next Generation of Security for the Social Web, Retrieved on May 31, 2011 at: http://www.websense.com/content/Defensio.aspx.

* cited by examiner

*Primary Examiner* — Venkat Perungavoor
*Assistant Examiner* — Amir Mehrmanesh
(74) *Attorney, Agent, or Firm* — Wilmer Cutler Pickering Hale and Dorr LLP

(57) ABSTRACT

Techniques for providing protection against unsafe links on a social networking website are disclosed. In one particular exemplary embodiment, the techniques may be realized as a method for providing protection against unsafe links on a social networking website comprising: receiving, from the social networking website, user profile data associated with a user of the social networking website, scanning, from the user profile data, a plurality of links, accessing a safety rating for each of the plurality of links, and outputting, to a client device associated with the user, a link analysis report that indicates the safety rating of one or more of the plurality of links.

20 Claims, 8 Drawing Sheets

Safe Application protected my News Feed

Safe Application performed an auto-scan of my News Feed and found 5 warning link(s). Below is a sample of the link(s):

Http://mrgustafson.com/: WARN YOUR FRIENDS
Http://stowerichards.com/: WARN YOUR FRIENDS
Http://omnifabllc.com/: WARN YOUR FRIENDS
Http://maesenglish.com/: WARN YOUR FRIENDS
Http://mrgustafson.com/: WARN YOUR FRIENDS

Yesterday at 6:23 AM via Feed Viewer [Comment] [Like]

*FIG. 5B*

TECHNIQUES FOR PROVIDING PROTECTION AGAINST UNSAFE LINKS ON A SOCIAL NETWORKING WEBSITE

FIELD OF THE DISCLOSURE

The present disclosure relates generally to protection against unsafe links and, more particularly, to techniques for providing protection against unsafe links on a social networking website.

BACKGROUND OF THE DISCLOSURE

Social networking websites (e.g., www.Facebook.com, www.Twitter.com, www.MySpace.com) have become extremely popular among online users in recent years. Some of these social networking websites boast having close to one billion online users. As a result, many social networking websites have become a prime target for hackers. Given the weakness of the security measures available, many of these social networking websites come under scrutiny for failing to provide effective protection against malicious tactics of cyber criminals.

In view of the foregoing, it may be understood that there may be significant problems and shortcomings associated with current online privacy and security technologies.

SUMMARY OF THE DISCLOSURE

Techniques for providing protection against unsafe links on a social networking website are disclosed. In one particular exemplary embodiment, the techniques may be realized as a method for providing protection against unsafe links on a social networking website comprising: receiving, from the social networking website, user profile data associated with a user of the social networking website, scanning, from the user profile data, a plurality of links, accessing a safety rating for each of the plurality of links, and outputting, to a client device associated with the user, a link analysis report that indicates the safety rating of one or more of the plurality of links.

In accordance with other aspects of this particular exemplary embodiment, the method may further comprise receiving, from the client device, permissions data associated with the user.

In accordance with further aspects of this particular exemplary embodiment, the method may further comprise accessing the permissions data prior to receiving the user profile data.

In accordance with additional aspects of this particular exemplary embodiment, the user profile data may be associated with a user profile of the user on the social networking website.

In accordance with other aspects of this particular exemplary embodiment, each of the plurality of links may comprise a hyperlink.

In accordance with further aspects of this particular exemplary embodiment, accessing the safety rating for each of the plurality of links may further comprise accessing a web reputation service.

In accordance with additional aspects of this particular exemplary embodiment, the safety rating of a link may indicate a safety risk level associated with the link.

In accordance with other aspects of this particular exemplary embodiment, the safety rating may indicate at least one of a high safety risk level, a medium safety risk level, and a low safety risk level.

In accordance with further aspects of this particular exemplary embodiment, the link analysis report may indicate a provider for each of the one or more of the plurality of links.

In accordance with additional aspects of this particular exemplary embodiment, the method may further comprise allowing the user to share the link analysis report with one or more other users of the social networking website.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process.

In another particular exemplary embodiment, the technique may be realized as an apparatus for providing protection against unsafe links on a social networking website, the article of manufacture comprising: at least one non-transitory processor readable medium, and instructions stored on the at least one medium, wherein the instructions are configured to be readable from the at least one medium by at least one processor and thereby cause the at least one processor to operate so as to: receive, from the social networking website, user profile data associated with a user of the social networking website, scan, from the user profile data, a plurality of links, access a safety rating for each of the plurality of links, and output, to a client device associated with the user, a link analysis report that indicates the safety rating of one or more of the plurality of links.

In another particular exemplary embodiment, the technique may be realized as a system for providing protection against unsafe links on a social networking website comprising: one or more processors communicatively coupled to a network, wherein the one or more processors are configured to: receive, from the social networking website, user profile data associated with a user of the social networking website, scan, from the user profile data, a plurality of links, access a safety rating for each of the plurality of links, and output, to a client device associated with the user, a link analysis report that indicates the safety rating of one or more of the plurality of links.

In accordance with other aspects of this particular exemplary embodiment, the one or more processors may be configured to receive, from the client device, permissions data associated with the user.

In accordance with further aspects of this particular exemplary embodiment, the one or more processors may be configured to access the permissions data prior to receiving the user profile data.

In accordance with additional aspects of this particular exemplary embodiment, the user profile data may be associated with a user profile of the user on the social networking website.

In accordance with other aspects of this particular exemplary embodiment, each of the plurality of links may comprise a hyperlink.

In accordance with further aspects of this particular exemplary embodiment, the one or more processors may be configured to access the safety rating for each of the plurality of links by accessing a web reputation service.

In accordance with additional aspects of this particular exemplary embodiment, the safety rating of a link may indicate a safety risk level associated with the link.

In accordance with other aspects of this particular exemplary embodiment, the safety rating may indicate at least one of a high safety risk level, a medium safety risk level, and a low safety risk level.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 5B shows another link analysis report generated from an automatic scan procedure in accordance with an embodiment of the present disclosure.

DETAILED DESCRIPTION OF EXEMPLARY EMBODIMENTS

Figure 1:
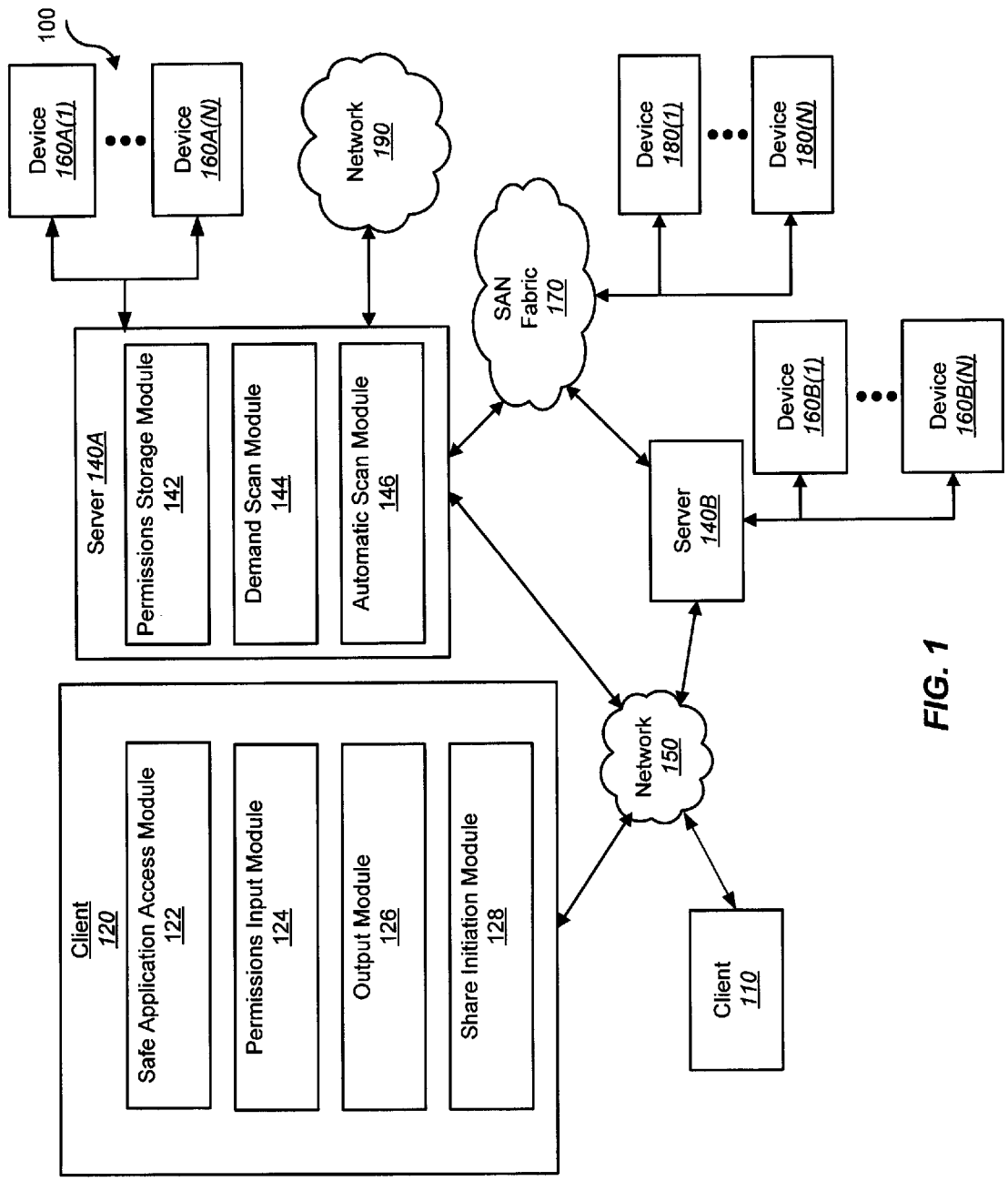
FIG. 1 shows a block diagram depicting a network architecture containing a platform for providing protection against unsafe links on a social networking website in accordance with an embodiment of the present disclosure.

Currently, a social networking website (e.g., www.Facebook.com, www.Twitter.com, www.MySpace.com) may provide online users with limited protection against cyber crimes (e.g., security breaches, privacy breaches, data breaches) using a blacklist detection technique, a violation report technique, or a combination of both. A blacklist detection technique may operate by comparing a Uniform Resource Locator (URL) or a domain name to a list of URLs or domain names known to be malicious. If, for example, a URL or domain name appears on the list, the blacklist detection technique may remove the URL or domain name from the social networking website. The blacklist detection technique, however, fails to provide sufficient protection because it is static and can be easily circumvented using URL redirection.

A violation report technique may operate by removing a URL or a domain name from a social networking website based on one or more violation reports (e.g., a report drafted by an online user and indicating that a URL or a domain name is associated with malicious activity) submitted by one or more online users of the social networking website. Similar to the blacklist detection technique, the violation report technique fails to provide sufficient protection because it is slow to respond to real-time threats as a result of its reliance upon human intervention (e.g., the drafting of the violation report). Accordingly, current protection mechanisms utilized by social networking websites may be ineffective and inefficient.

In one embodiment, certain techniques for providing protection against unsafe links (e.g., URLs, hyperlinks) on a social networking website are provided. In such an embodiment, a safe application accessible via a social networking website may be initiated (e.g., activated, accessed, added) by an online user of the social networking website to scan links associated with a user profile of the online user. After initiation, the safe application may request and receive permissions data from the online user.

Permissions data may include any data that indicates whether permission has been granted for the safe application to perform a particular task by an online user. For example, first permissions data inputted by an online user may permit the safe application to access a news feed and a display area (e.g., a Facebook wall) associated with a user profile of the online user. In another example, second permissions data inputted by an online user may permit the safe application to access a news feed and a display area associated with a user profile of the online user while the online user is not logged into the social networking website. In another example, third permissions data inputted by an online user may permit the safe application to post (e.g., display) information (e.g., a link analysis report) in a news feed, a display area associated with a user profile of the online user, or a combination of both. In yet another example, fourth permissions data inputted by an online user may permit the safe application to periodically (e.g., once a month) transmit a message to the online user and one or more other online users of the social networking website (e.g., friends of an online user).

Based on the permissions data received, the safe application may initiate a demand scan procedure, an automatic scan procedure, or a combination of both. A demand scan procedure may initially scan links in data associated with a user profile of an online user (e.g., a news feed, a display area, a message board) after initiation of the safe application. Accordingly, the demand scan procedure may immediately launch after permissions data indicating at least a grant of permission to access a news feed and a display area (e.g., a Facebook wall) associated with a user profile of the online user is received.

In one embodiment, the demand scan procedure may determine the safety rating of each link posted in data associated with the user profile of the online user (e.g., a news feed, a display area, a message board) within a period of time (e.g., links posted within the last 24 hours). A safety rating may indicate a safety risk level that indicates the likelihood that a particular link is associated with any, or combination, of a security risk, a malicious download, a browser exploit, and a phishing website. For example, a first link (e.g., a link to an article on the New York Times website) may be associated with a low safety risk level. In another example, a second link (e.g., a link to a picture on a blog website) may be associated with a medium safety risk level. In yet another example, a third link (e.g., a link to an executable on a website known to contain malicious content) may be associated with a high safety risk level. Based on the safety ratings determined, the demand scan procedure may output an analysis of one or more scanned links in a link analysis report.

An automatic scan procedure may periodically (e.g., once every hour, once every 3 hours, once a day) scan newly posted links in data associated with a user profile of an online user (e.g., a news feed, a display area, a message board) after activation of the automatic scan feature of the safe application. Accordingly, the automatic scan procedure may be initiated after permissions data indicating at least a grant of permission to access a news feed and a display area (e.g., a Facebook wall) associated with a user profile of the online user, a grant of permission to access a news feed and a display area associated with the user profile of the online user while the online user is not logged into the social networking website, a grant of permission to post (e.g., display) information (e.g., a link analysis report) in a news feed, a display area associated with a user profile of the online user, or a combination of both, and a grant of permission to periodically (e.g., once a month) transmit a message to the online user and one or more other online users of the social networking website (e.g., friends of the online user) is received.

In another embodiment, the automatic scan procedure may periodically determine the safety rating of each newly posted link located in data associated with the user profile of the online user (e.g., a news feed, a display area, a message board). Based on the safety ratings determined, the automatic scan procedure may output (e.g., post) an analysis of one or more scanned links (e.g., the links that indicate a medium safety risk level or a high safety risk level) in a link analysis report to a display area in the user profile (e.g., a Facebook wall) of the online user. Accordingly, one or more other online users of the social networking website may be able to review the posted link analysis report.

The safe application may also allow an online user of the social networking website to pre-check a link prior to sharing the link with other online users of the social networking website. Accordingly, the online user may access the safety rating of a link prior to sharing the link with other online users.

FIG. 1 shows a block diagram depicting a network architecture 100 containing a platform for providing protection against unsafe links on a social networking website in accordance with an embodiment of the present disclosure. FIG. 1 is a simplified view of network architecture 100, which may include additional elements that are not depicted. Network architecture 100 may contain client 110, client 120, server 140A, as well as server 140B (one or more of which may be implemented using computer system 200 shown in FIG. 2). Client 110, client 120, server 140A, and server 140B may be communicatively coupled to a network 150. Server 140A may be communicatively coupled to storage devices 160A(1)-(N), and server 140B may be communicatively coupled to storage devices 160B(1)-(N). Server 140A may contain one or more modules for providing protection against unsafe links on a social networking website including a permissions storage module 142, a demand scan module 144, and an automatic scan module 146. Server 140A and server 140B may be communicatively coupled to a SAN (Storage Area Network) fabric 170. SAN fabric 170 may support access to storage devices 180(1)-(N) by server 140A and server 140B, and by client 110 and client 120 via network 150. Server 140A may be communicatively coupled to network 190. Client 120 may contain one or more modules for providing protection against unsafe links on a social networking website including safe application access module 122, permissions input module 124, output module 126, and share initiation module 128.

Figure 2:
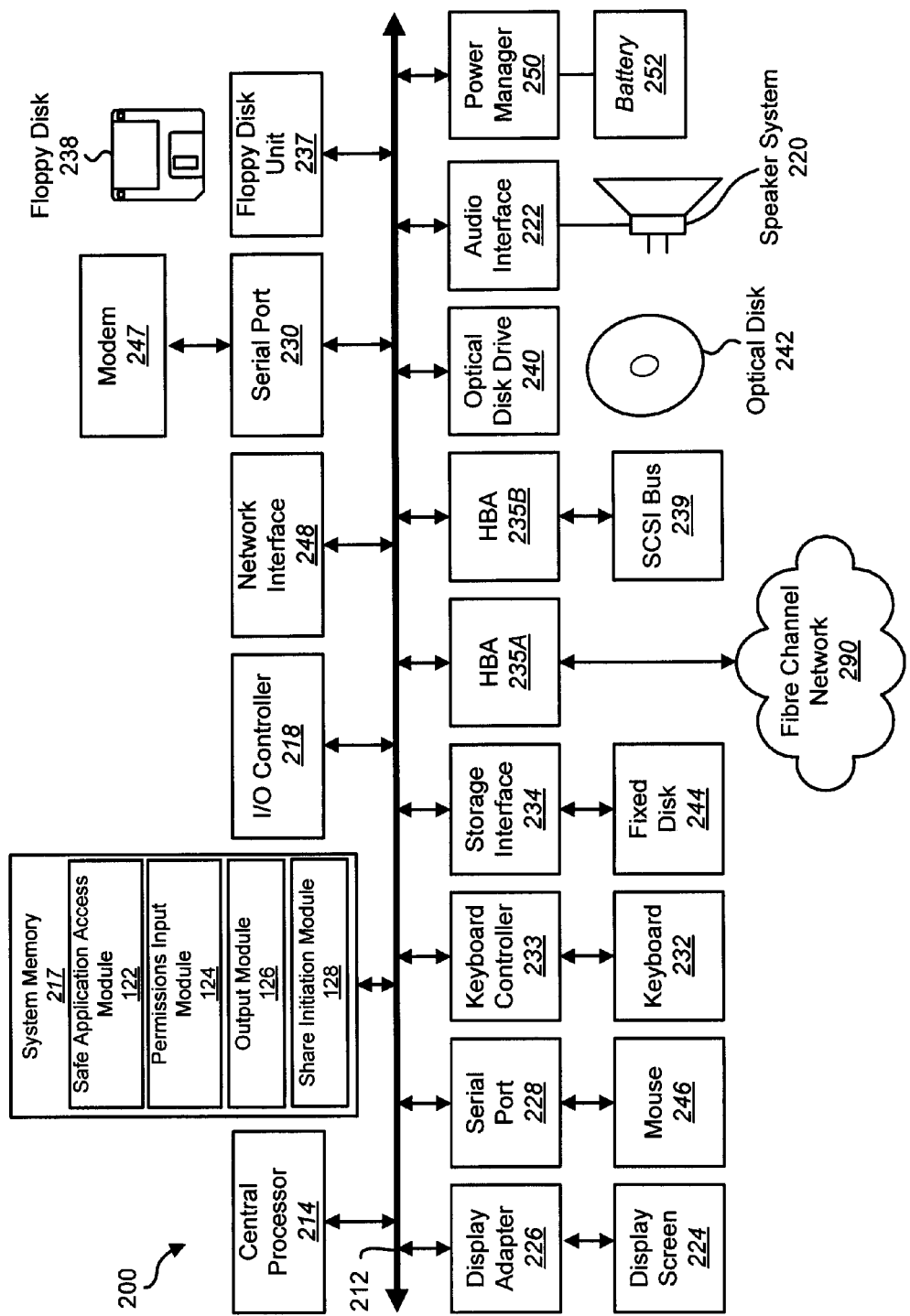
FIG. 2 depicts a block diagram of a computer system in accordance with an embodiment of the present disclosure.

With reference to computer system 200 of FIG. 2, modem 247, network interface 248, or some other method may be used to provide connectivity from one or more of client 110 and client 120 to network 150. Client 120 may be able to access information on server 140A or server 140B using, for example, a web browser or other client software. Such a client may allow client 120 to access data hosted by server 140A or server 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, client 120, server 140A, server 140B, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to client 110, client 120, server 140A, or server 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup, replication, or archival purposes.

According to some embodiments, client 110 and client 120 may be a smartphone, PDA, desktop computer, a laptop computer, a server, another computer, or another device coupled via a wireless or wired connection to network 150. Client 110 and client 120 may receive data from user input, a database, a file, a web service, and/or an application programming interface.

Server 140A and server 140B may be application servers, archival platforms, backup servers, backend servers, network storage devices, media servers, email servers, document management platforms, enterprise search servers, or other devices communicatively coupled to network 150. Server 140A and server 140B may utilize one of storage devices 160A(1)-(N), 160B(1)-(N), and/or 180(1)-(N) for the storage of application data, replication data, backup data, or other data. Server 140A and server 140B may be hosts, such as an application server, which may process data traveling between client 110 and client 120 and a backup platform, a backup process, and/or storage. According to some embodiments, server 140A and server 140B may be platforms used for backing up and/or archiving data.

Safe application access module 122, permissions input module 124, output module 126, share initiation module 128, permissions storage module 142, demand scan module 144, and automatic scan module 146 are discussed in further detail below.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, safe application access module 122, permissions input module 124, output module 126, and share initiation module 128 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
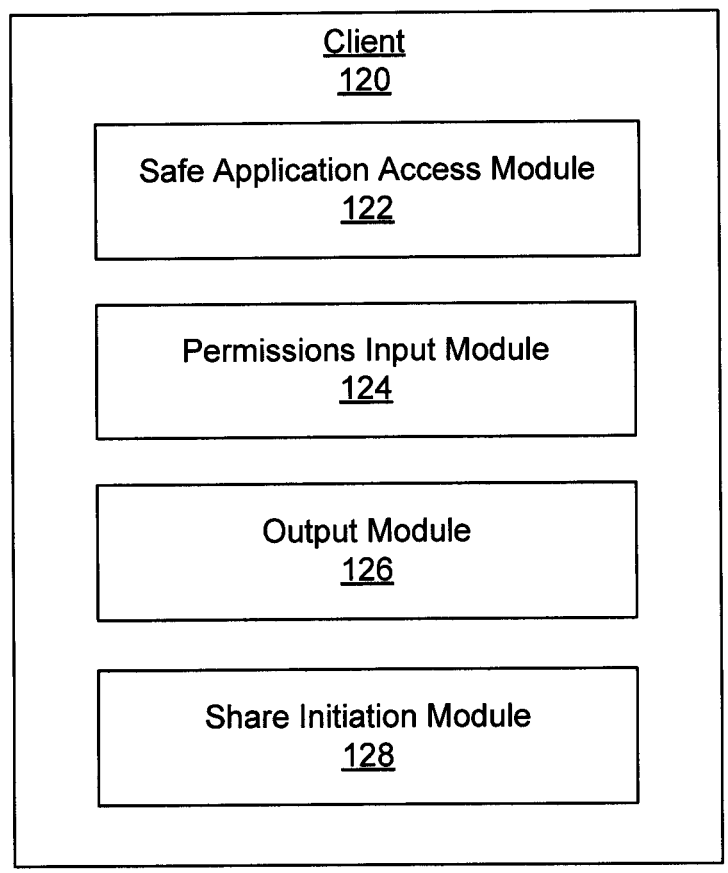
FIG. 3 shows modules of a client in accordance with an embodiment of the present disclosure.

FIG. 3 shows modules of a client 120 in accordance with an embodiment of the present disclosure. As illustrated, the client 120 may contain one or more components including a safe application access module 122, a permissions input module 124, an output module 126, and share initiation module 128.

The description below describes network elements, computers, and/or components of a system and method for providing protection against unsafe links on a social networking website that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Safe application access module 122 may be configured to allow an online user of a social networking website to access a safe application via the social networking website using a client device (e.g., client 120). In one embodiment, the safe application access module 122 may provide a link (e.g., a URL, a hyperlink) to the safe application in a list of applications accessible via the social networking website. Accordingly, an online user desiring to activate one or more scanning features of the safe application on a corresponding user profile may access the safe application via the safe application link. Upon activation of the safe application link, safe application may be executed on the user profile of the online user.

Permissions input module 124 may be configured to allow an online user to input permissions data into the safe application using a client device (e.g., client 120). As previously described, permissions data may include any data that indicates whether permission has been granted for the safe application to perform a particular task by an online user. For example, first permissions data inputted by an online user may permit the safe application to access a news feed and a display area (e.g., a Facebook wall) associated with a user profile of the online user. In another example, second permissions data inputted by an online user may permit the safe application to access a news feed and a display area associated with a user profile of the online user while the online user is not logged into the social networking website. In another example, third permissions data inputted by an online user may permit the safe application to post (e.g., display) information (e.g., a link analysis report) in a news feed, a display area (e.g., a Facebook wall) associated with a user profile of the online user, or a combination of both. In yet another example, fourth permissions data inputted by an online user may permit the safe application to periodically (e.g., once a month) transmit a message to an online user and one or more other online users of the social networking website (e.g., friends of an online user).

Permissions input module 124 may be configured to transmit the permissions data received from an online user to server 140A. In one embodiment, permissions data received by server 140A may be stored according to the online user that generated the permissions data.

Output module 126 may be configured to output (e.g., display, post) the result of one or more scanning features of the safe application. In one embodiment, the output module 126 may output (e.g., display) the results of an initial scan of one or more links located in data of a user profile (e.g., user profile data) of an online user in a link analysis report generated by the execution of a demand scan procedure of the safe application. In another embodiment, the output module 126 may also output (e.g., display, post) the results of a periodic scan of one or more links located in data of a user profile (e.g., user profile data) of an online user in a link analysis report generated by the execution of an automatic scan procedure of the safe application. In such an embodiment, the output module 126 may post the link analysis report to a display area of the user profile (e.g., a Facebook wall). Accordingly, one or more other online users of the social networking website (e.g., friends of an online user) may be able to review the posted link analysis report.

Output module 126 may also be configured to output results of a scan procedure (e.g., demand scan procedure, automatic scan procedure) via any, or a combination, of an electronic mail message, a text message, an instant message, and any other communication mechanism that adequately communicates scan results.

Share initiation module 128 may be configured to allow an online user associated with a user profile on which a link analysis report is posted to share the link analysis report with one or more other online users of a social networking website. Such other online users of the social networking website may include one or more friends of the online user. In one embodiment, the share initiation module 128 may allow the online user to share the link analysis report or a portion of the link analysis report by activating a link (e.g., a "WARN YOUR FRIENDS" link) in the link analysis report. In another embodiment, the share initiation module 128 may allow the online user to share the link analysis report via any, or a combination, of an electronic mail message, a text message, an instant message, and any other communication mechanism that adequately communicates scan results.

Figure 4:
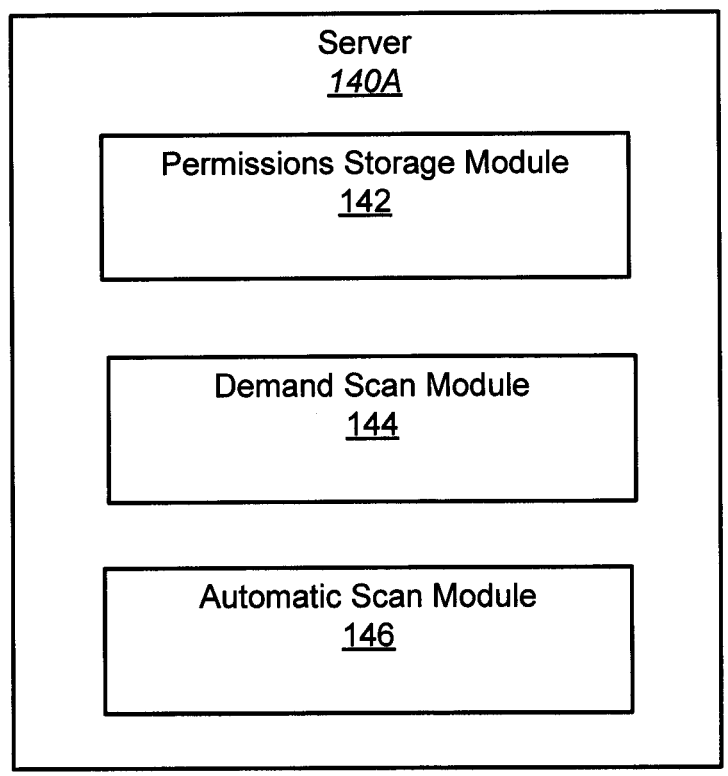
FIG. 4 shows modules of a server in accordance with an embodiment of the present disclosure.

FIG. 4 shows modules of a server 140A in accordance with an embodiment of the present disclosure. As illustrated, the server 140A may contain one or more components including a permissions storage module 142, a demand scan module 144, and an automatic scan module 146.

The description below describes network elements, computers, and/or components of a system and method for providing protection against unsafe links on a social networking website that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Permissions storage module 142 may be configured to receive and store permissions data generated by one or more online users of a social networking website using one or more client devices (e.g., client 120, client 110). In one embodiment, the permissions data received may be stored according to the online user that generated the permissions data. Permissions storage module 142 may allow one or more scanning procedures (e.g., a demand scan procedure, an automatic scan procedure) of the safe application to access the permissions data stored.

Demand scan module 144 may be configured to perform (e.g., execute) a demand scan procedure of the safe application. The demand scan module 144 may initiate the demand scan procedure on behalf of an online user of a social networking website upon detecting the presence of permissions data that indicates at least a grant of permission to access user profile data (e.g., news feed data, display area data) associated with a user profile of the online user in the permissions storage module 142.

Once the presence of permissions data providing sufficient permission is detected, the demand scan procedure may scan the user profile data (e.g., news feed data, display area data) associated with the online user to identify one or more links posted within a period of time (e.g., links posted within the last 24 hours). The demand scan procedure may then determine the safety rating for each identified link.

In one embodiment, the demand scan module 144 may access a web reputation service (WRS) to determine the safety rating for each identified link. As previously described, a safety rating may indicate a safety risk level that indicates the likelihood that a particular link is associated with any, or combination, of a security risk, a malicious download, a browser exploit, and a phishing website. For example, a first link (e.g., a link to an article on the New York Times website) may be associated with a low safety risk level. In another example, a second link (e.g., a link to a picture on a blog website) may be associated with a medium safety risk level. In yet another example, a third link (e.g., a link to an executable on a website known to contain malicious content) may be associated with a high safety risk level. The demand scan procedure may also determine the safety rating of the full version of each shortened link (e.g., a link shortened by a link shortening service).

Once the safety rating of each of the identified links is determined, demand scan module 144 may output information associated with the result of the demand scan procedure in a link analysis report. In one embodiment, the link analysis report generated by a demand scan procedure may indicate the amount of links scanned and the safety rating for each scanned link. In another embodiment, the link analysis report generated by a demand scan procedure may indicate the posted information associated with each scanned link and the initiator of each post (e.g., an indication of the online user that posted a scanned link). In another embodiment, the link analysis report generated by a demand scan procedure may indicate the URL associated with each scanned link (e.g., the full version URL, the shortened URL). In yet another embodiment, the link analysis report generated by a demand scan procedure may include a link to a full site analysis made available by the WRS for each scanned link.

Automatic scan module 146 may be configured to perform (e.g., execute) an automatic scan procedure of the safe application if an online user activates the automatic scan procedure (e.g., clicks on an automatic scan procedure activation button). As previously discussed, an automatic scan procedure may periodically (e.g., once every hour, once every 3 hours, once a day) scan newly posted links in user profile data (e.g., a news feed data, a display area data, a message board data) associated with a user profile of the online user.

In one embodiment, the automatic scan procedure may initiate by determining whether sufficient permissions have been given by the online user to perform the tasks of the automatic scan procedure. Accordingly, the automatic scan module 146 may determine whether permissions data that at least indicates a grant of permission to access user profile data (e.g., news feed data, display area data) associated with the user profile of the online user, a grant of permission to access user profile data associated with the user profile of the online user while the online user is not logged into the social networking website, a grant of permission to post (e.g., display) information (e.g., a link analysis report) in user profile data associated with the user profile of the online user, and a grant of permission to periodically (e.g., once a month) transmit a message to the online user and one or more other online users of the social networking website (e.g., friends of the online user) is stored in the permissions storage module 142.

Once the presence of permissions data providing sufficient permission is determined, the automatic scan procedure may periodically scan the user profile data (e.g., news feed data, display area data) associated with the user profile of the online user to identify one or more newly posted links. The automatic scan procedure may then determine the safety rating for each identified link.

In one embodiment, the automatic scan module 146 may access a web reputation service (WRS) to determine the safety rating for each identified link. The automatic scan procedure may also determine the safety rating of the full version of each shortened link (e.g., a link shortened by a link shortening service).

Once the safety rating of each of the identified links is determined, automatic scan module 146 may output information associated with the result of the automatic scan procedure in a link analysis report. In one embodiment, the link analysis report generated by an automatic scan procedure may indicate the amount of links scanned and the safety rating for each scanned link. In another embodiment, the link analysis report generated by an automatic scan procedure may indicate the posted information associated with each scanned link and the initiator of each post (e.g., an indication of the online user that posted a scanned link). In another embodiment, the link analysis report generated by an automatic scan procedure may indicate the URL associated with each scanned link (e.g., the full version URL, the shortened URL). In yet another embodiment, the link analysis report generated by an automatic scan procedure may include a link to a full site analysis made available by the WRS for each scanned link.

In another embodiment, the link analysis report generated by an automatic scan procedure may provide information for scanned links associated with a particular safety rating. For example, the link analysis report generated by an automatic scan procedure may provide information for scanned links that are associated with a safety rating that indicates any, or a combination, of a medium safety risk level and a high safety risk level. Accordingly, scanned links that are associated with a safety rating that indicates a low safety risk level may not be included in the link analysis report.

Figure 5A:
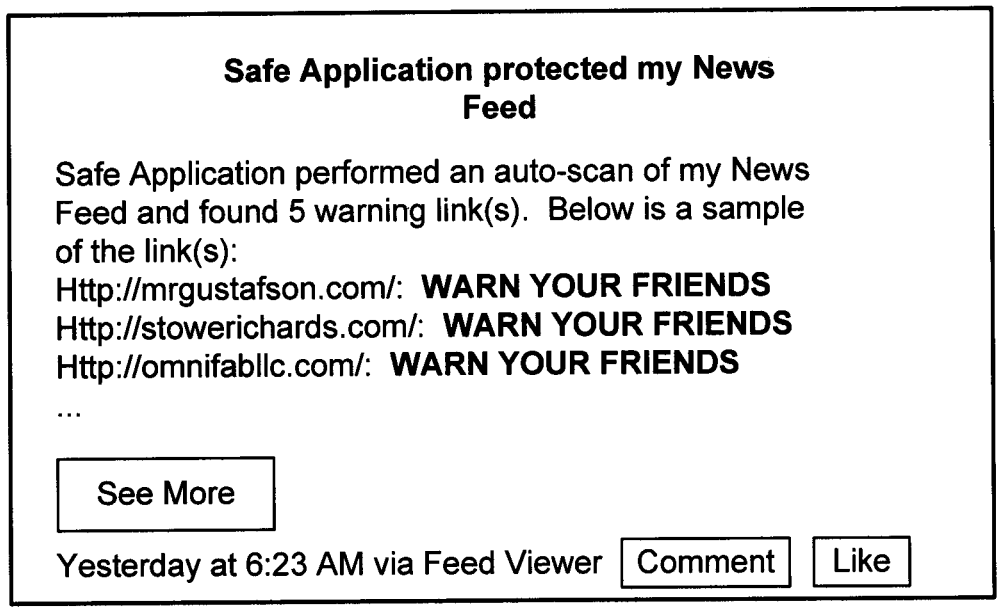
FIG. 5A shows a link analysis report generated from an automatic scan procedure in accordance with an embodiment of the present disclosure.

FIG. 5A shows a link analysis report generated from an automatic scan procedure in accordance with an embodiment of the present disclosure. As illustrated, a link analysis report may warn an online user about five (5) scanned links. Given the limited amount of space available on a display area (e.g., Facebook wall) associated with a user profile, the link analysis report may display a shortened list of URLs associated with the scanned links. An online user may access a full list of URLs associated with the scanned links by activating a button (e.g., "See More" button) in the link analysis report.

As shown, an online user may activate a link (e.g., a "WARN YOUR FRIENDS" link) corresponding to a scanned link in the link analysis report to share the link analysis report or a portion of the link analysis report with one or more other online users (e.g., friends of an online user) of the social networking website.

FIG. 5B shows another link analysis report generated from an automatic scan procedure in accordance with an embodiment of the present disclosure. As previously described, given the limited amount of space available on a display area (e.g., Facebook wall) associated with a user profile, the link analysis report may display a shortened list of URLs associated with the scanned links. An online user may access a full list of URLs associated with the scanned links by activating a button (e.g., "See More" button) in the link analysis report. Accordingly, the link analysis report illustrated in FIG. 5B may include the full list of URLs associated with the link analysis report illustrated in FIG. 5A.

Figure 6:
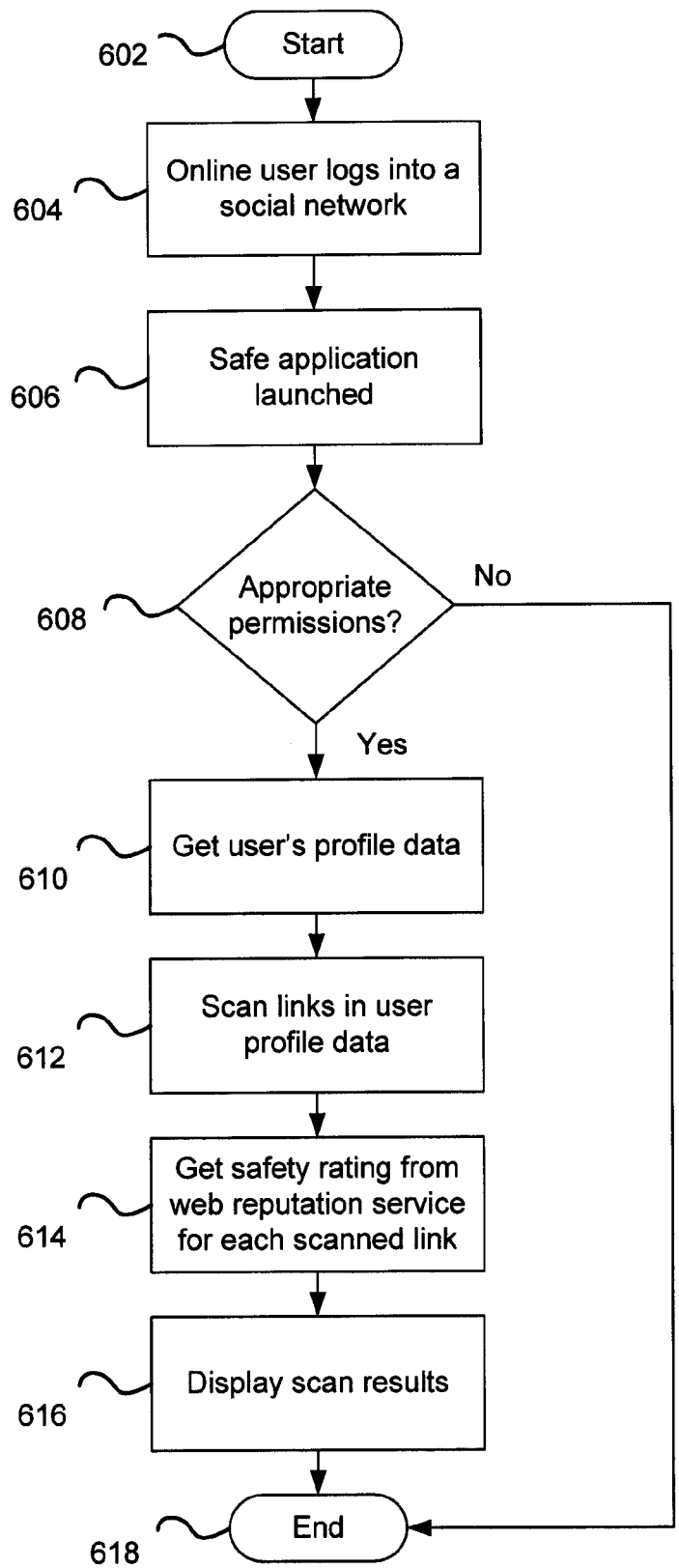
FIG. 6 depicts a method for providing protection against unsafe links on a social networking website in accordance with an embodiment of the present disclosure.

FIG. 6 depicts a method 600 for providing protection against unsafe links on a social networking website in accordance with an embodiment of the present disclosure. At block 602, the method 600 may begin.

At block 604, an online user of a social networking website (e.g., Facebook) logs into the social networking website. At block 606, the safe application is launched in response to input from the online user (e.g., the online user activates a "Safe Application" link).

At block 608, it is determined whether the appropriate permissions have been given to execute a scan procedure (e.g., demand scan procedure, automatic scan procedure). If, for example, the appropriate permissions have not been granted, the method 600 may end at block 618. If, however, the appropriate permissions have been granted, news feed data associated with user profile data may be accessed at block 610.

At block 612, one or more links in the news feed data are scanned. At block 614, the safety rating for each scanned link is accessed from a web reputation service. At block 616, the scan results are displayed in a link analysis report.

At block 618, the method 600 may end.

Figure 7:
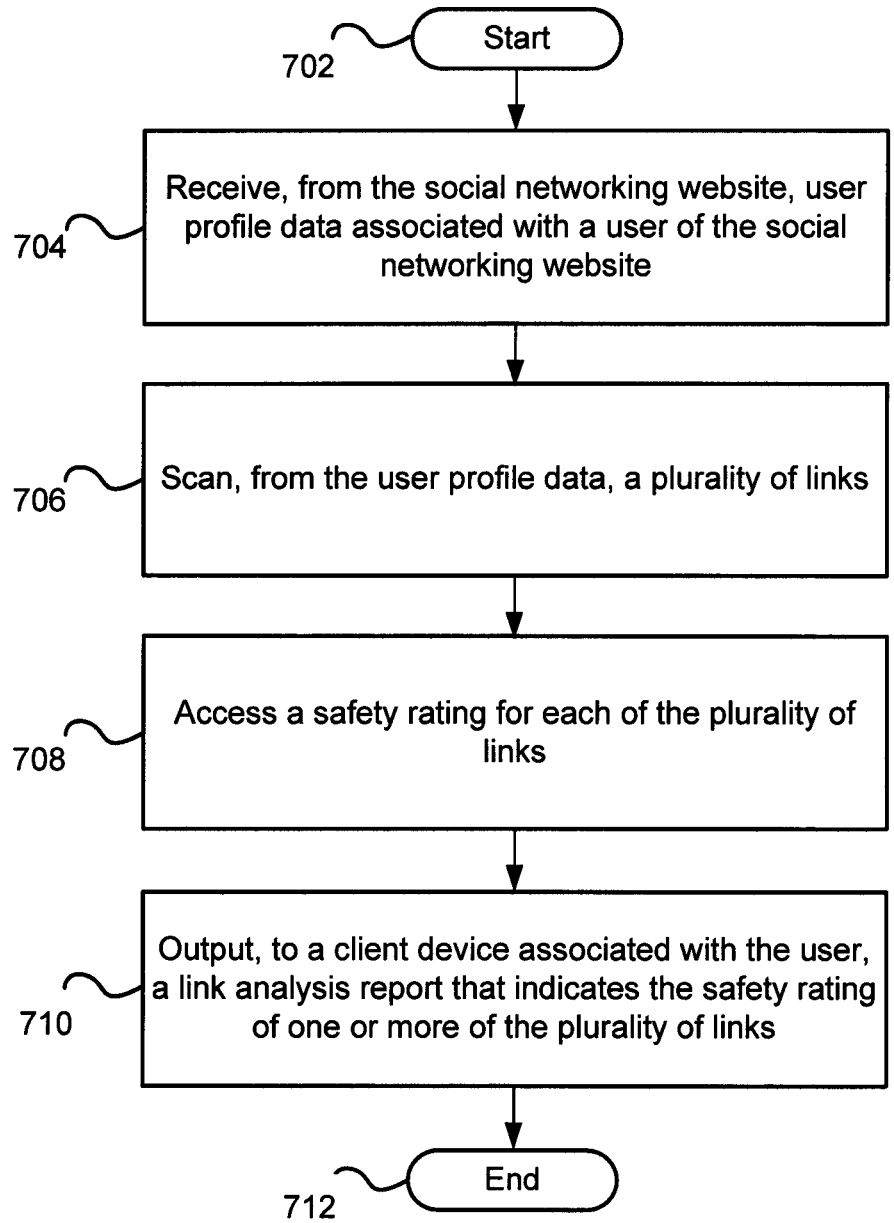
FIG. 7 depicts another method for providing protection against unsafe links on a social networking website in accordance with an embodiment of the present disclosure.

FIG. 7 depicts another method 700 for providing protection against unsafe links on a social networking website in accordance with an embodiment of the present disclosure. At block 702, the method 700 may begin.

At block 704, user profile data associated with a user of a social networking website is received from the social networking website. In one embodiment, an application programming interface (API) associated with the social networking website may allow access to user profile data associated with one or more online users. User profile data may be associated with a user profile of an online user of the social networking website. In one embodiment, the user profile data may include news feed data associated with a news feed on the user profile. In another embodiment, the user profile data may include display area data associated with a display area (e.g., Facebook wall) on the user profile.

At block 706, a plurality of links are scanned from the user profile data. In one embodiment, the plurality of links may be scanned as a result of a demand scan procedure of the safe application. Accordingly, the links that have been posted on the user profile within the last 24 hours may be scanned. In another embodiment, the plurality of links may be scanned as a result of an automatic scan procedure of the safe application.

At block 708, the safety rating for each of the plurality of links is accessed. In one embodiment, the safety rating for each of the plurality of links may be accessed from a web reputation service (WRS). Accordingly, each of the plurality of links may indicate a safety rating of a high safety risk level, a medium safety risk level, or a low safety risk level.

At block 710, a link analysis report that indicates the safety rating of one or more of the plurality of links is outputted to a client device associated with the user. In one embodiment, the link analysis report may be posted to a display area (e.g., a Facebook wall) of the user profile. In another embodiment, the link analysis report may be outputted via any, or a combination, of an electronic mail message, a text message, an instant message, and any other communication mechanism that adequately communicates a link analysis report.

At block 712, the method 700 may end.

At this point it should be noted that providing protection against unsafe links on a social networking website in accordance with the present disclosure as described above may involve the processing of input data and the generation of output data to some extent. This input data processing and output data generation may be implemented in hardware or software. For example, specific electronic components may be employed in a demand scan module or similar or related circuitry for implementing the functions associated with providing protection against unsafe links on a social networking website in accordance with the present disclosure as described above. Alternatively, one or more processors operating in accordance with instructions may implement the functions associated with providing protection against unsafe links on a social networking website in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for providing protection against unsafe links on a social networking website comprising:

receiving, from the social networking website, user profile data associated with a user of the social networking website;

scanning a plurality of links in the user profile data, wherein the scanning is automatically performed periodically on newly posted links in the user profile data;

accessing a safety rating for each of the plurality of links; and outputting, to a client device associated with the user, a link analysis report that indicates the safety rating of each of one or more of the plurality of links.

2. The method of claim 1, further comprising receiving, from the client device, permissions data associated with the user.

3. The method of claim 2, further comprising accessing the permissions data prior to receiving the user profile data.

4. The method of claim 1, wherein the user profile data is associated with a user profile of the user on the social networking website.

5. The method of claim 1, wherein each of the plurality of links comprises a hyperlink.

6. The method of claim 1, wherein accessing the safety rating for each of the plurality of links further comprises accessing a web reputation service.

7. The method of claim 1, wherein the safety rating of a link indicates a safety risk level associated with the link.

8. The method of claim 1, wherein the safety rating indicates at least one of a high safety risk level, a medium safety risk level, and a low safety risk level.

9. The method of claim 1, wherein the link analysis report indicates a provider for each of the one or more of the plurality of links.

10. The method of claim 1, further comprising allowing the user to share the link analysis report with one or more other users of the social networking website.

11. At least one non-transitory processor readable storage medium for storing a computer program of instructions configured to be readable by at least one processor for instructing the at least one processor to execute a computer process for performing the method as recited in claim 1.

12. An article of manufacture for providing protection against unsafe links on a social networking website, the article of manufacture comprising:

at least one non-transitory processor readable medium; and
instructions stored on the at least one medium;
wherein the instructions are configured to be readable from the at least one medium by at least one processor and thereby cause the at least one processor to operate so as to:

receive, from the social networking website, user profile data associated with a user of the social networking website;

scan a plurality of links in the user profile data, wherein the scanning is automatically performed periodically on newly posted links in the user profile data;

access a safety rating for each of the plurality of links; and output, to a client device associated with the user, a link analysis report that indicates the safety rating of each of one or more of the plurality of links.

13. A system for providing protection against unsafe links on a social networking website comprising:

one or more hardware processors communicatively coupled to a network; wherein the one or more processors are configured to:

receive, from the social networking website, user profile data associated with a user of the social networking website;

scan a plurality of links in the user profile data, wherein the scanning is automatically performed periodically on newly posted links in the user profile data;

access a safety rating for each of the plurality of links; and output, to a client device associated with the user, a link analysis report that indicates the safety rating of each of one or more of the plurality of links.

14. The system of claim 13, wherein the one or more processors are configured to receive, from the client device, permissions data associated with the user.

15. The system of claim 14, wherein the one or more processors are configured to access the permissions data prior to receiving the user profile data.

16. The system of claim 13, wherein the user profile data is associated with a user profile of the user on the social networking website.

17. The system of claim 13, wherein each of the plurality of links comprises a hyperlink.

18. The system of claim 13, wherein the one or more processors are configured to access the safety rating for each of the plurality of links by accessing a web reputation service.

19. The system of claim 13, wherein the safety rating of a link indicates a safety risk level associated with the link.

20. The system of claim 13, wherein the safety rating indicates at least one of a high safety risk level, a medium safety risk level, and a low safety risk level.

* * * * *